United States Patent [19]

Soulier

[11] Patent Number: 5,394,141

[45] Date of Patent: Feb. 28, 1995

[54] METHOD AND APPARATUS FOR TRANSMITTING INFORMATION BETWEEN EQUIPMENT AT THE BOTTOM OF A DRILLING OR PRODUCTION OPERATION AND THE SURFACE

[75] Inventor: Louis Soulier, Sannois, France

[73] Assignee: Geoservices, Le Blanc Mesnil, France

[21] Appl. No.: 911,095

[22] Filed: Jul. 9, 1992

[30] Foreign Application Priority Data

Sep. 12, 1991 [FR] France .................. 91 11279

[51] Int. Cl.$^6$ ............................................. G01V 1/00
[52] U.S. Cl. .............................. 340/854.4; 340/854.6; 340/854.8; 340/854.5; 175/40
[58] Field of Search ............... 340/854.4, 854.6, 854.8, 340/854.5; 175/40

[56] References Cited

U.S. PATENT DOCUMENTS

| | | | |
|---|---|---|---|
| Re. 33,690 | 9/1991 | Adams, Jr. et al. | 166/53 |
| 2,225,668 | 12/1940 | Subkow et al. | 340/854.6 |
| 2,400,170 | 5/1946 | Silverman | 340/854.6 |
| 4,616,702 | 10/1986 | Hanson et al. | 340/854.6 |
| 4,839,644 | 6/1989 | Safinya et al. | 340/854 |
| 4,864,293 | 9/1989 | Chau | 340/854.6 |
| 5,130,706 | 7/1992 | Van Steenwyk | 340/854.6 |
| 5,138,313 | 8/1992 | Barrington | 340/854.6 |
| 5,189,415 | 2/1993 | Shimada et al. | 340/854.6 |

OTHER PUBLICATIONS

*The A.R.R.L. Antenna Book*, The American Radio Relay League, Inc. ©1960, p. 21.

Primary Examiner—J. Woodrow Eldred
Attorney, Agent, or Firm—Wenderoth, Lind & Ponack

[57] ABSTRACT

Information can be transmitted between equipment at the bottom of a drilling operation and the surface. A transceiver is provided at the surface, and is connected to both the earth, or the bottom of the ocean in an offshore operation, spaced from the drilling operation, and metal pipework used in the drilling operation. A transmitter/receiver is used for applying and receiving electric signals between two points on the metal pipework. The two points are separated at a substantial distance along the metal pipework such that the resistance of the metal pipework connecting the two points is relatively low but greater than zero. No insulating junction is then needed to be interposed between the two points in the metal pipework connecting the two points. Preferably, the transmitter/receiver has upper and lower conductors with first and second polar ends at the two points, thus forming a dipole of substantial length across the metal pipework.

38 Claims, 6 Drawing Sheets

METHOD AND APPARATUS FOR TRANSMITTING INFORMATION BETWEEN EQUIPMENT AT THE BOTTOM OF A DRILLING OR PRODUCTION OPERATION AND THE SURFACE

BACKGROUND OF THE INVENTION

1. Field of the Invention

The present invention relates to a method and apparatus for transmitting information to an electromagnetic receiving and control device connected to underground pipework having a substantial length. Specifically, the present invention relates to fluid transport equipment, in particular underground fluid transport equipment, in very deep vertical, diagonal or horizontal pipework, such as the pipework used, for example, in various drilling and fluid transport equipment of oil or gas drilling and production operations.

2. State of the Prior Art

With regard to drilling, and in particular regard to oil wells, it is important to be able to transmit from the bottom of the drill well to the surface the information gathered by measurement sensors. The sensors supply useful information for the subsequent working of the site, for example data regarding pressure, the nature of the solids and fluids encountered, the temperature, etc. It is also important to be able to transmit orders from the surface controlling various equipment and devices such as valves, protective covers, etc., which are found at the bottom of the drilling or production operation.

Traditionally, the transmission of such data requires that an electric cable be lowered into the well, the lower part of the cable being connected to measurement sensors, and the upper part of the cable being handled by a special winch and electrically fed, and connected to processing apparatus for processing the signals indicating the measurements of the sensors. However, a cable incorporating such sensors, or being connected to control sensors or devices, located at a substantial depth cannot be lowered in every situation. In particular, the cable may not be able to be lowered when a drill well is being operated, or when valves or separation devices cannot be crossed by a cable, whether or not the cable is fitted with sensors.

Another method of transmitting data has been termed the "downhole measurement while drilling" technique (DHMWD, or simply MWD). This technique has been recently developed, and includes transmitting data via pressure pulses or mud pulses in the mud-circulation channel formed by the pipes during drilling. This is thus an acoustic transmission procedure. This procedure, like the procedure discussed above, has proved to be unreliable, very costly and very limiting. The procedure is limited to wells in which there is ongoing drilling. The procedure cannot be applied to production wells or wells in which tests are being performed, for example.

Electromagnetic transmission devices are applicable to all well configurations, such as drilling wells, wells being tested, wells in which production monitoring is required, etc. In the conventional mode of electromagnetic transmission, it has already been proposed to use a device which incorporates a transmission/reception aerial system that comprises an electrically insulating junction electrically separating the upper part of a drill string, which guides the signal, from the lower part of the drill string, the lower part acting as an antenna.

Figure 1:
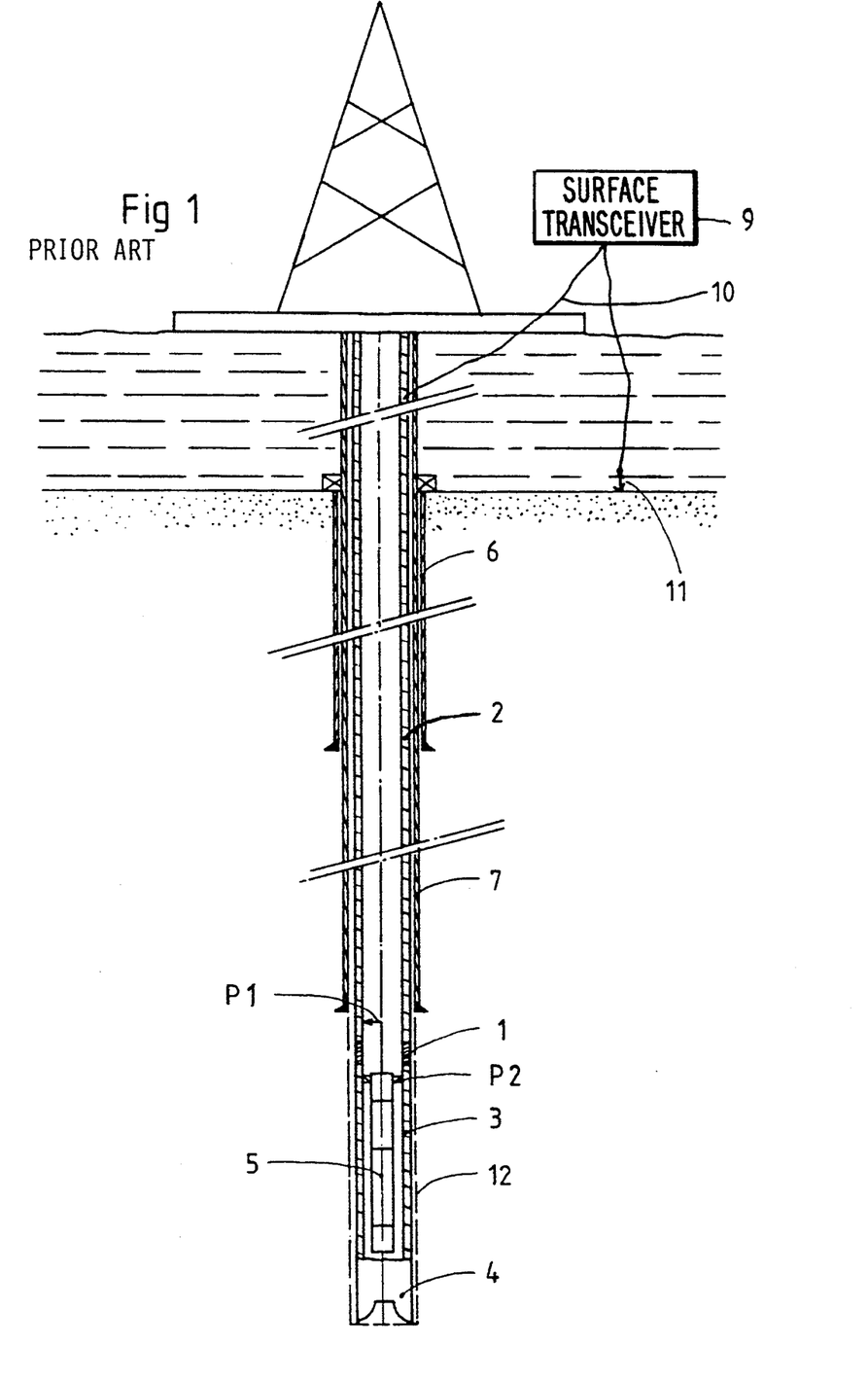
FIG. 1 is an elevational view partially in cross-section of a conventional off-shore drilling arrangement employing a conventional electromagnetic method of information transmission using an insulating junction between one drill pipe and another drill pipe incorporating a bit of the drill.

FIG. 1 represents a conventional MWD device for real-time measurement during drilling. A conventional dipole system is formed by an electrically insulating junction 1 which insulates an upper part 2 of a drill string from a lower part 3. The lower part 3 incorporates a terminal pipe equipped with a drill bit 4.

Inside of the drill string is a cylindrical element 5 enclosing, in a conventional manner, sensors, an electronic unit, and an energy source such as batteries. A modulated low frequency alternating electric signal is delivered between an upper pole $P_1$ and a lower pole $P_2$ located on the drill string incorporating the bit 4. The modulated signal, of several hertz, is representative of measurement performed by the sensors. The applied current has a value of some amps under a voltage of some volts.

Measurements which are presently made with this type of device include what is termed the geometric position of the tool in drilling operations when deviation from the vertical occurs, a wide-spread phenomena. The geometric position is delimited by three angles, that is, the inclination angle, the azimuth angle, and the tool face angle. Other useful measurements include the natural radioactivity of the soils (gamma ray), the pressure and temperature of the fluid inside and outside the drill string, and other measurements, such as the radioactivity caused by a neutron source, etc.

The signal applied between the poles $P_1$ and $P_2$ gives rise to the propagation of an electromagnetic wave in the soils surrounding the well. The electromagnetic wave is guided by the metal pipework formed by the upper string 2 and successive casings 6 and 7. Note that the "open hole" portion of the drill string is designated by reference numeral 12 below casing 7. The electromagnetic wave is guided by the metal pipework and is sent to the surface where it is collected by a transceiver 9. The transceiver 9 is connected first to the mass of a drilling apparatus 10, or to a well head, or to any other pipe in the well, and second to ground 11 positioned as far away as possible from the well, and which is generally at the bottom of the ocean in off-shore installations.

While this conventional system possesses the significant advantages of simplicity, reliability and utility, the possible distance of propagation of the electromagnetic waves depends closely on the average resistivity of the soils. The average resistivity, however, can vary considerably as a function of the drilling site. When the resistivity is approximately 10 ohms/meter, as is the case in secondary sedimentary ground in areas such as the Paris Basin or the center of the United States of America, a transmission over a distance of 3,000 to 4,000 meters may be achieved.

On the other hand, with the current state of the art, this technique can only be used in wells of a restricted depth (approximately 1200 to 1500 meters) for wells drilled in soils whose average resistivity approaches 1 ohm per meter, such as those found in pericontinental tertiary sedimentary soils, such as the soils found in the North Sea, the Gulf of Mexico and the Gulf of Guinea in West Africa. This transmission depth restriction is completely insufficient for most oil drilling operations, which extend to a depth of between 2000 and more than 4000 meters.

SUMMARY OF THE INVENTION

As can be seen from the above discussion, problems frequently arise in connection with the transmission of information along underground metal pipework as used in drilling and production wells in the lithosphere. It is therefore the object of the present invention to provide a technique and an apparatus making it possible to considerably increase the distance of propagation of signals that transmit information or data along metal pipework in drilling or production wells.

Furthermore, the primary object of the present invention is to provide a method and apparatus for effectively propagating, over the entire length of an underground pipework, and in particular in an oil, gas or water well, electromagnetic waves for the transmission of information. It is a further object of the present invention to substantially eliminate or compensate for the disadvantages of the prior art as discussed above while reducing the amount of energy required for transmission, reducing the cost of maintenance and increasing the output of information.

In accordance with the present invention, it has been determined that the direct transmission of a signal is improved especially because of the fact that the impedance per unit length of the pipework, which is partially resistive and partially inductive, is low, but not zero. This fact in the conventional method of propagation as discussed above is a disadvantage. But with the present invention, this fact secures a number of advantages with regard to the method according to the present invention, and is universally applicable, even in combination with the conventional electromagnetic system.

Accordingly, the present invention provides a method and apparatus for transmitting information such as various parameters, data and control orders by means of a metal conductor, along metal pipework which is capable of universal application including horizontal pipework such as pipe lines and horizontal drill pipes.

According to the present invention information is transmitted between equipment at the bottom of a drilling or production operation and the surface by providing a transmitter at the equipment at the bottom of the operation. The transceiver is provided at the surface and is connected to both ground (the earth or the bottom of the ocean), spaced from the drilling operation, and to metal pipework of the drilling operation. Electric signals are applied with the transmitting between two points on the metal pipework, the two points being separated a substantial distance along the metal pipework such that the resistance of the metal pipework connecting the two points where the electric signal is applied is relatively low but greater than zero. An electrically-insulated junction is thus not required to be interposed between the two points.

Preferably the transmitter has an upper conductor with a first polar end and a lower conductor with a second polar end, both the conductors being connected to the transmitter. The electric signal is applied by connecting the first and second polar ends to the metal pipework, the polar ends of the conductors forming a dipole of substantial length along the metal pipework. Preferably, the polar ends are separated as far away from each other as is possible.

Further, the metal pipework according to one feature of the present invention comprises a plurality of drill pipes, and the dipole has a length longer than one of the drill pipes. Also, the metal pipework can comprise a plurality of casing sections, with the dipole having a length extending over several of the casing sections. A drill pipe is 9 meters long, and thus the dipole preferably is longer than 9 meters. Even more preferably, the dipole longer than 27 meters, corresponding to three drill pipes.

Further, the upper pole is preferably separated a substantial distance from the surface of the earth or the bottom of the ocean, and the lower pole is preferably separated from the lower end of the metal pipework, such as the lower free end of the drill or production pipe, by a substantial distance. For example, both the poles should preferably be spaced the length of several drill pipes or several casing sections from the surface of the earth or the bottom of the ocean, and the lower free end of the pipework, respectively.

While an insulating connection between the metal pipework sections of the first and second poles is unnecessary, one can be provided if so desired. Also, the transmitter can be located outside of the space between the first and second poles of the dipole along the metal pipework. The transmitter could further be located between the pipe extending in the casing and the casing itself, as opposed to inside of the pipe. The transmitter could also be located against the rock exterior of the casing, if so desired.

The metal pipework according to one feature of the present invention can also be provided with electrical insulation between the polar ends of the conductors.

According to a further embodiment of the present invention, a conductor cable forms the upper conductor and suspends the transmitter inside the metal pipework. The conductor cable preferably comprises an insulated core and a metal jacket short circuited with the polar ends of the conductors. The metal jacket extends over the transmitter.

According to a further embodiment of the present invention, the metal pipework comprises the casing. The drill string inside the casing forms the upper and lower conductors as well as the first and second polar ends. The polar ends are defined by points of contact between the drill string and the casing, the drill string having a plurality of casing protectors thereon between the polar ends. The transmitter is preferably located between the drill string and the casing, the drill string having an electrical insulator separating the upper and lower conductors.

According to another embodiment of the present invention, the metal pipework comprises production tubing. The upper conductor is formed by a cable and a collar connected to the cable and the production tubing, forming the first polar end. The lower conductor is formed by a collar connected to both the transmitter and the production tubing. The cable is preferably an insulated conductor disposed inside a metal clad tube. The transmitter is disposed inside of a continuous metal jacket.

According to yet another feature of the present invention, the metal pipework may be electrically insulated over its length between the polar ends.

The above method and apparatus according to the present invention may be applied, for example, to the recording of measurements during drilling operations (MWD, measurement while drilling), to production tests (drill stem tests), to measurements made by permanent gauges for measurements of various parameters, and to control various devices positioned at the bottom of the well, such as safety valves.

BRIEF DESCRIPTION OF THE DRAWINGS

Other features and advantages of the present invention will appear from the following description, taken in conjunction with the accompanying drawings (not to scale), wherein.

DETAILED DESCRIPTION OF THE PREFERRED EMBODIMENTS

Figure 2:
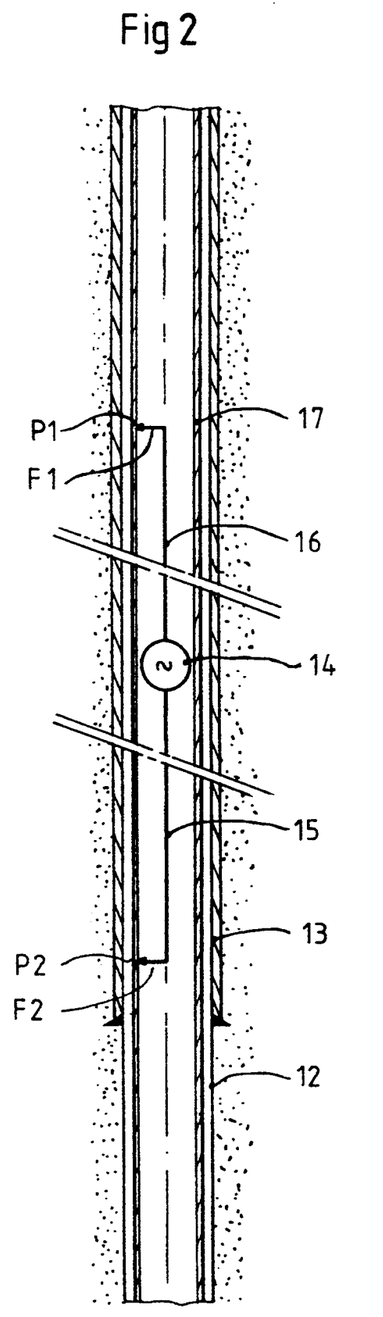
FIG. 2 is a schematic, elevational view in longitudinal axial cross-section of the present invention.

FIG. 2 illustrates the basic layout of the apparatus according to the present invention. A dipole device having poles $P_1$ and $P_2$ is installed in a drilling well, the drilling well incorporating an open hole wall 12, a casing 13 above the wall 12 and a drill string 17. A transmitting device 14 is provided for emitting an electric signal. The transmitting device 14 has a lower insulated conductive wire 15 and an upper conductive wire 16, also insulated. The ends of the conductors, referenced by arrows F1 and F2, terminate in poles $P_1$ and $P_2$ of the dipole. The dipole extends over a considerable distance of the drill string 17. The effectiveness of the apparatus is proportional to the distance $P_1$ and $P_2$. This distance should always be greater than one length of drill pipe (nine meters) or casing section, or one metal pipework section (the term metal pipework as used herein will refer to drill strings or pipes, production pipes or casings). Preferably the distance is greater than at least three drilling or production pipes.

As illustrated in FIG. 2, the transmitter 14 and the conductive wires 15 and 16 are inside of the drill string 17. However, as will be discussed in more detail below, both the transmitter 14 and the conductive wires 15 and 16 could be housed in the annular space between the drill strings 17 and the casing 13 of the well.

Figure 3:
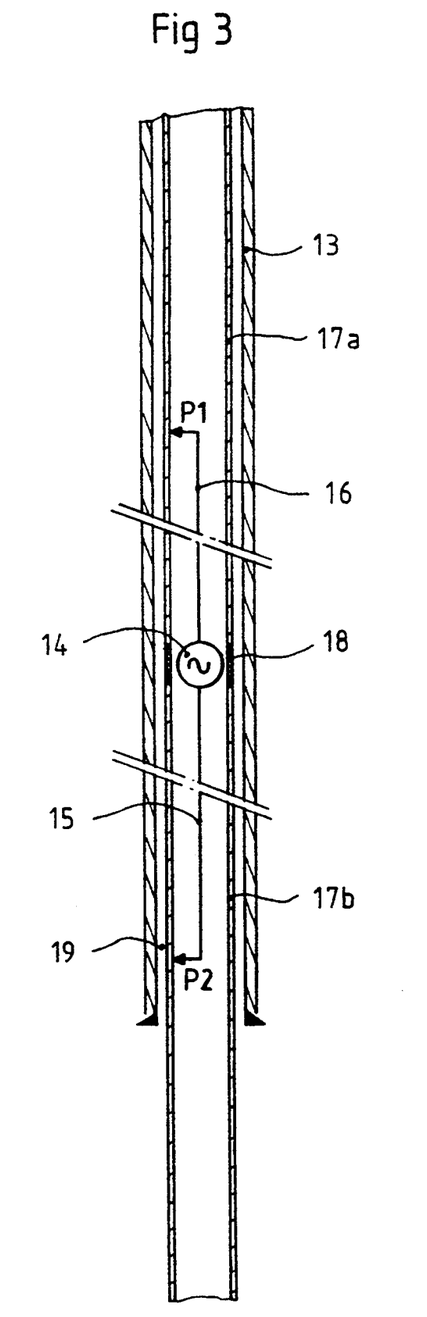
FIG. 3 is a schematic, elevational view in longitudinal axial cross-section of a modification of the arrangement according to the present invention illustrated in FIG. 1.

FIG. 3 illustrates a variation of the apparatus illustrated in FIG. 2. The variation is only due to the existence of an electrically insulating junction 18 interposed between an upper section 17a and a lower section 17b of the drill string 17. The electrically insulating junction 18 is entirely optional according to the present invention, but may still be provided. The transmitter (or transceiver) 14 is positioned at the level of the insulating junction 18. The transmitter 14 could be installed at any level inside the drill string 17.

As illustrated, the drilling or completion fluid which is present in an annular space 19 between the drill or production pipes 17a and 17b and the casing 13 facilitates the transmission of the signal to the casing at each of the poles $P_1$ and $P_2$.

It is not generally very feasible to position the transmitter 14 outside of the casing (in contact with rock). This would make the installation of the transmitter as well as the conductors rather difficult in addition to complicating the potential repair thereof. However, the transmitter could equally well be sheathed and installed outside of the completion pipe within the annular space filled with fluid, in particular in situations calling for remote control of a test valve, a safety valve, a gas lift valve or any other operating device. It can still also be placed outside of the casing in contact with rock.

Figures 4, 5:
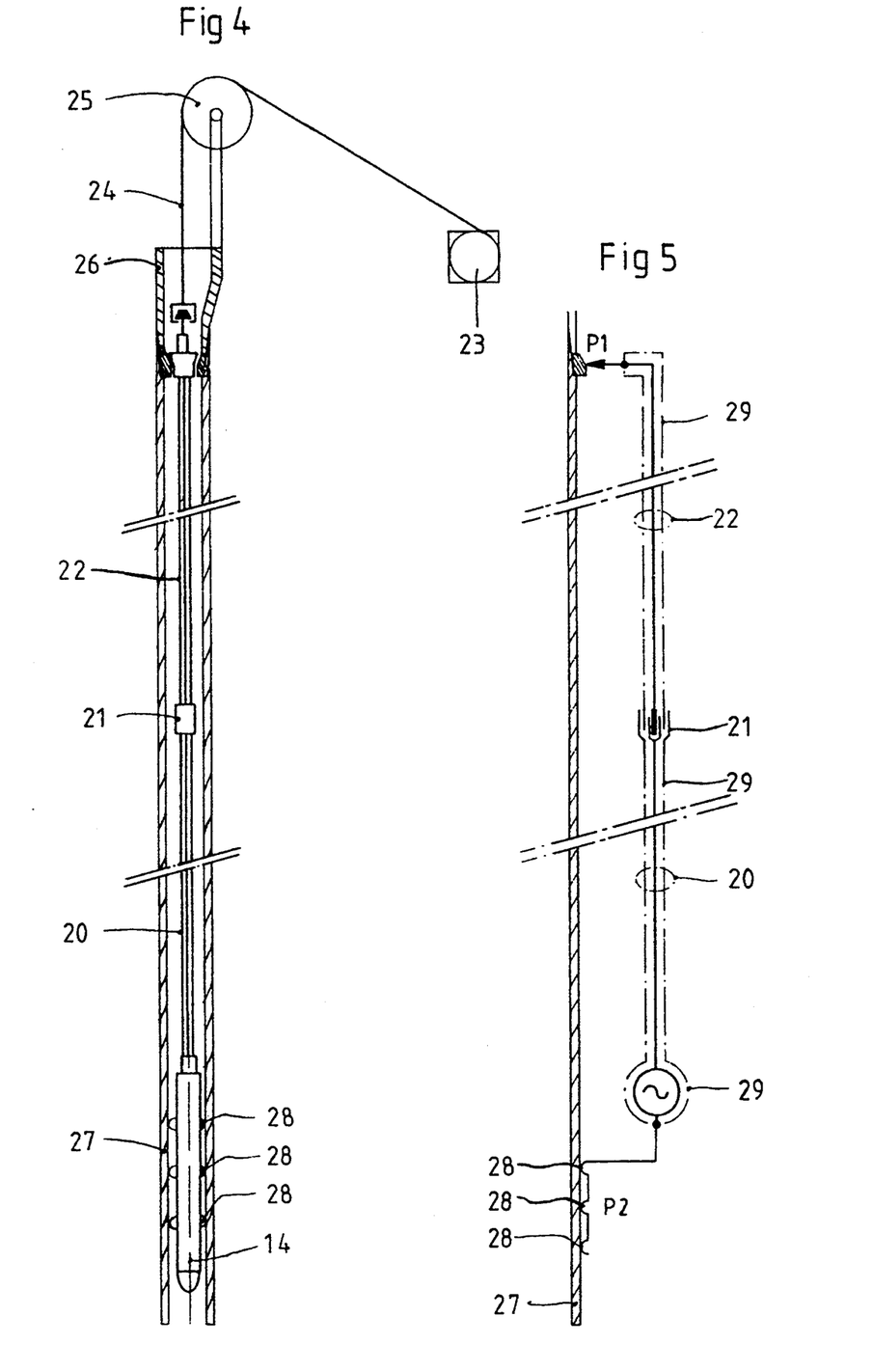
FIG. 4 is a schematic, elevational view in partial cross-section of an apparatus for transmitting information according to a further embodiment of the present invention.
FIG. 5 is a schematic illustration of an electronics unit and opposite poles in the apparatus of FIG. 4.

FIG. 4 illustrates a further embodiment of the present invention, a variation derived from FIGS. 2 and 3. In this embodiment, the transmitter 14 is suspended from an insulated single-wire conductor cable 20. The cable 20 is sheathed as required to withstand the stresses encountered. The conductor cable 20 is connected by an electric connection 21 to an extension cable 22. The extension cable 22 is wound on a conventional winch 23 by a handling cable 24 passing through a return pulley 25. A conventional movable brace 26 supports the return pulley 25. The movable brace 26 has a lower, tubular threaded end which screws into an upper threaded end of a terminal element of a drill string or completion or production pipes 27. The transmitter 14 is preferably provided with metal centering blocks 28 for centering the transmitter 14 inside the string 27. These elements also provide the connection for the lower pole $P_2$.

FIG. 5 illustrates the electrical connections between the poles $P_1$ and $P_2$, located on either side of the transmitter 14 on the wall of the string 27. The cables of the transmitter that connect with the poles $P_1$ and $P_2$ are placed in a continuous metal jacket 29, illustrated in single-dot chain lines. The jacket 29 also encloses the transmitter 14. The jacket is short circuited with the conductors an the level of the poles $P_1$ and $P_2$. While this short circuiting of the poles with the metal jacket 29 is ostensibly illogical, it is made possible by virtue of the pronounced difference between the impedance of the jacket 29 between $P_1$ and $P_2$ and the overall impedance extending between $P_1$ and $P_2$ on the metal conductors connecting the poles. The electric connector is also illustrated at reference number 21 in FIG. 5. The cables 20 and 22 are thus formed by the conductors inside of the metal jacket 29 and the metal jacket 29 itself. The metal jacket 29, it is noted, has a mechanical, but not an electric, function. The apparatus thus produced in accordance with FIGS. 4 and 5 proves advantageous by virtue of the fact that the short circuit resistance is not zero, thus making it possible to effectively transmit or receive an electric signal conveying information across the drill string or casing.

Figure 6:
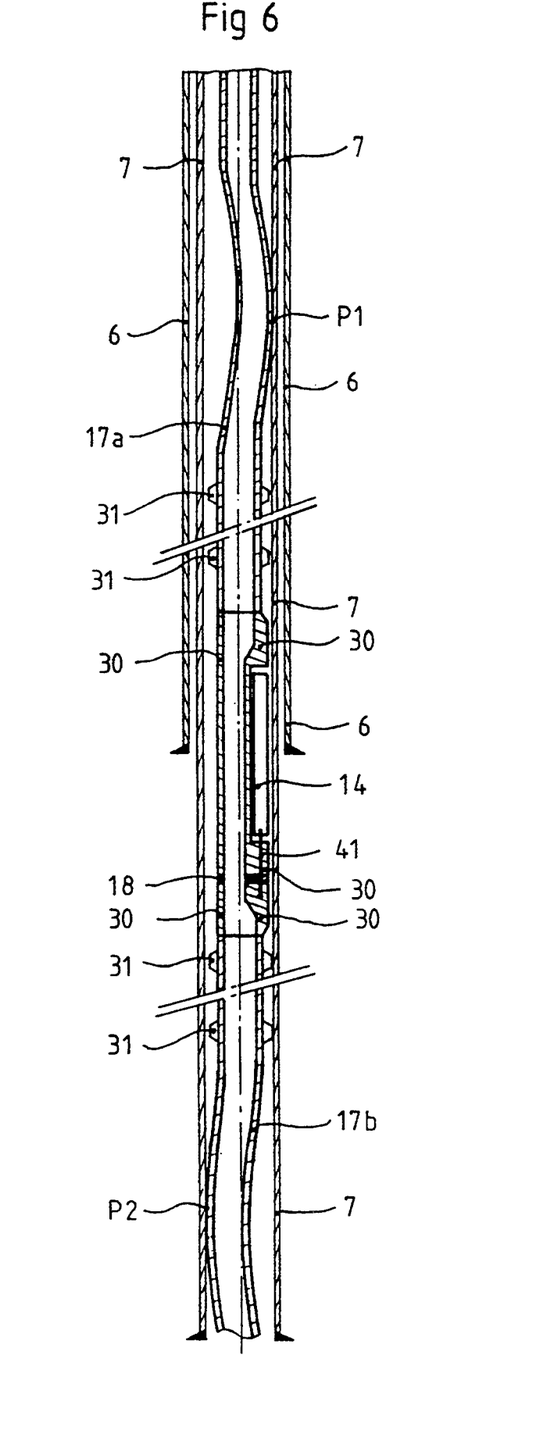
FIG. 6 is an elevational, schematic view in longitudinal axial cross-section of another embodiment of the apparatus for transmitting information according to the present invention.

FIG. 6 illustrates another variation of the apparatus according to the present invention. Specifically, the variation of FIG. 6 essentially replaces the conductive wires 15 and 16 with the drill string itself.

Noting FIG. 6, a drill string comprises an insulating junction 18 and an electronic case containing the transmitter 14. The electronic case, instead of being placed inside the drill string as in the preceding figures, is located outside of the drill string. The arrangement of the transmitter 14 and its electronic case as illustrated in FIG. 6 is referred to in the trade as a "gauge carrier" arrangement. The transmitter 14 applies these signals over the drill string portion 17a and 17b on either side of the insulating junction 18. The signals are applied by means of the jacket of the electronic case being in contact with drill string portion 17a and by an insulated electric conductor 41 in contact with drill string portion 17b.

A basic feature of this variation according to the present invention is its use in tubed wells, that is, wells employing casings such as external casing 6 and internal casing 7. Toric collars 31, known as casing protectors, are provided between the casing 7 and the drill string or pipework over a predetermined length above and below the transmitter 14. As their name implies, the casing protectors 31 are normally used to prevent the abrasions between the rotating drill pipes and the stationary casing.

However, as is illustrated at the top and bottom of FIG. 6, the drill string may come into contact with the casing at certain points of contact, thus forming the poles $P_1$ and $P_2$ illustrated in the drawing. This contact may happen either accidentally, as illustrated with FIG. 6, or when various elements are installed, such as packings and valves, providing a direct electrical connection between the inner drilling or production shafts or pipes to the outer casing sections.

With this embodiment, the drill string portions 17a and 17b forming the electric conductors from the transmitter 14 are insulated from the inner casing only by the fluid filling the well. The fluid may provide total insulation, such as with a hydrocarbon oil based mud, or partial insulation as with water based fluids. The fluid provided in the annular space between the drill string portion 17a and 17b and the inner casing 7 possesses a medium level of conductivity, but acts as an insulator as compared with the very low resistivity of the drill string and the casing.

Figures 7, 8:
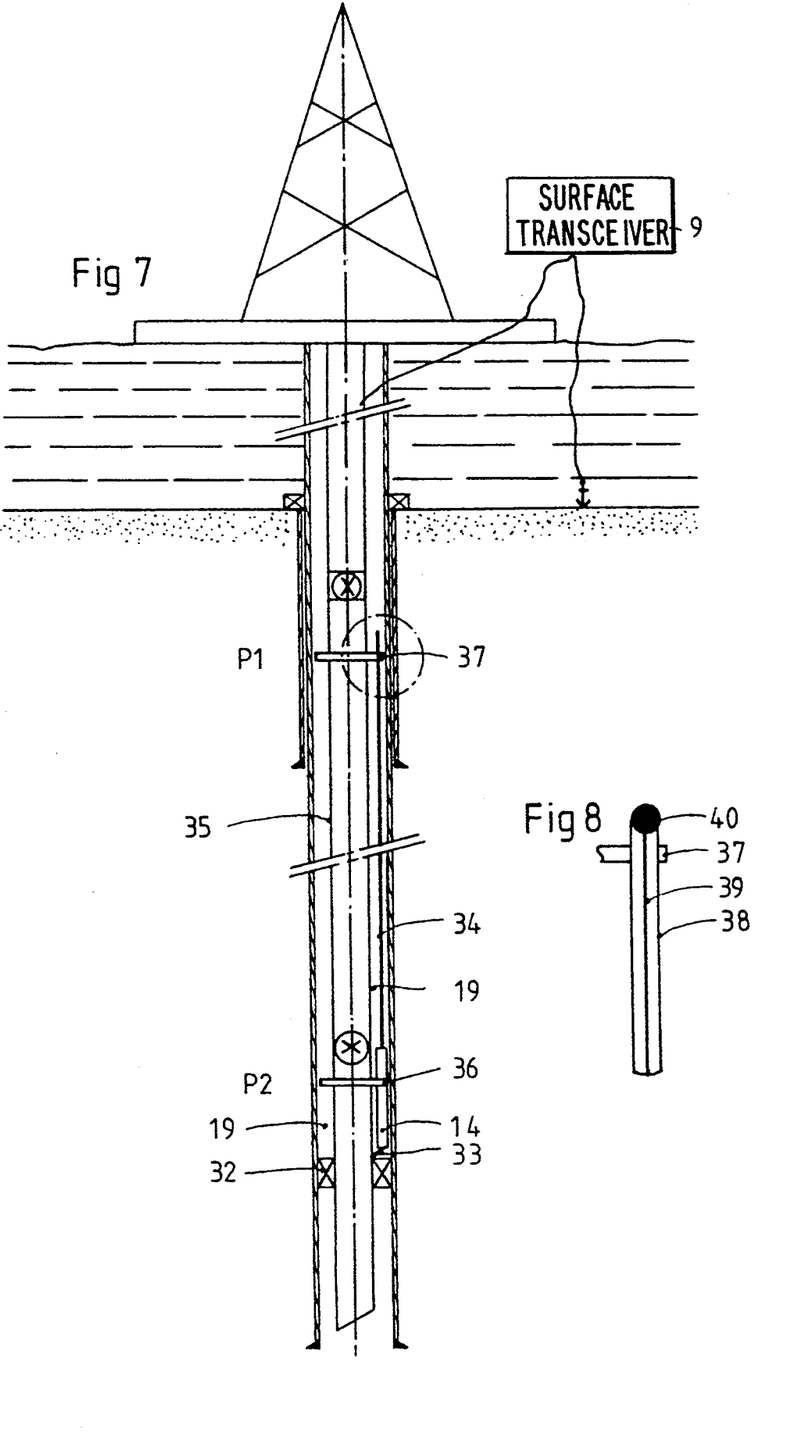
FIG. 7 is an elevational, schematic view in partial cross-section of an off-shore drilling layout employing a further embodiment of the apparatus for transmitting information according to the present invention.
FIG. 8 is an enlarged detail view of the circled portion of FIG. 7.

FIG. 7 illustrates yet another embodiment according to the present invention. This embodiment is specifically designed for situations calling for permanently installed gauges. Permanent gauges are usually measuring devices, normally measuring pressure and temperature, and sometimes the discharge rate, which are permanently installed at the bottom of a production well. They make it possible to monitor the change in the storage basin. Permanent gauge type installations are normally employed when the gauges are to be installed at the bottom of the well for more than six months.

The transmitter 14, including the measurement and transmission apparatus, is generally installed in an annular space 19 behind a sealing joint or packing 32. An internal pressure tap 33 allows the measurement of the pressure in the deposit to be monitored. A cable 34 connects the transmitter 14 to the upper pole $P_1$. This connection is made by attaching the cable 34 to tubing 35 of the production well by means of a collar 37. A collar 36 connects the transmitter 14 to the tubing 35 at the point of the lower pole $P_2$. The cable 34 is made employing a conventional sealed conductor formed by an insulated conductor placed inside a stainless steel, metal clad tube.

A distinctive feature of this apparatus is that the transmitter 14 along with the measurement apparatus is contained inside a continuous metal jacket. The continuous metal jacket contains the sensors, the measurement electronics, an energy source such as a battery, as well as the electric connection to the pole $P_1$.

FIG. 8 is an enlarged view of the end of the cable 34 at its upper end showing the connection to the upper collar 37. At the location of reference numeral 37 in the drawing is illustrated the electric connection to the tubing 35 which forms the pole $P_1$. At point 38 is illustrated the metal clad protective tube, whose diameter is generally $\frac{3}{8}''$ or $\frac{1}{4}''$. The radially insulated conductor inside of the metal clad protective tube 38 is labelled 39 in the drawing. The conductor 39 is connected to the metal clad protective tube 38 by a water-tight weld 40. The metal clad protective tube 38 is then electrically connected to the production tubing 35 by means of the upper collar 37.

The modulated signal emitted by the transmitter 14 is received by the surface transceiver 9 illustrated in FIG. 7 as with the previously described embodiments. With regard to completion fluids in the well, the cable 34 is completely sealed, existing as an entirely metal, welded continuous jacket.

The embodiment of FIGS. 7 and 8 as described above provides enhanced reliability for permanent gauge installations. This embodiment can also be employed for remote control of safety or test valves, or for any other device in a well or electrically conductive underground pipe.

Figure 9:
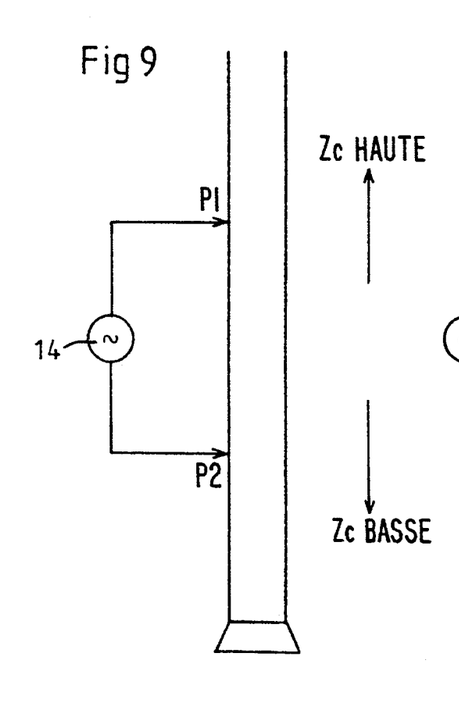
FIG. 9 is a diagram illustrating input and output poles together with a drill string.
Figure 10:
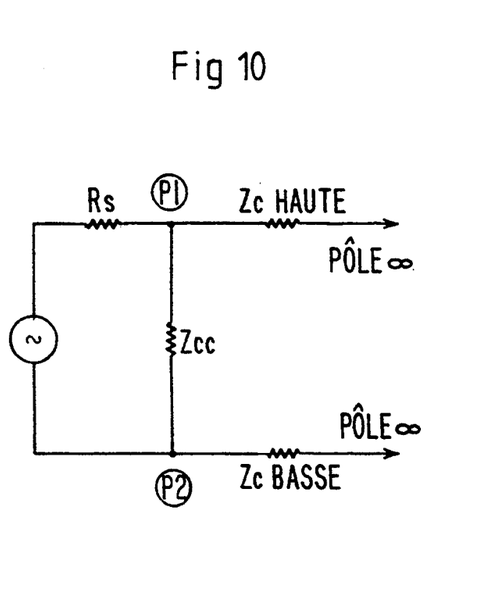
FIG. 10 is a circuit diagram of the present invention.
Figure 11:
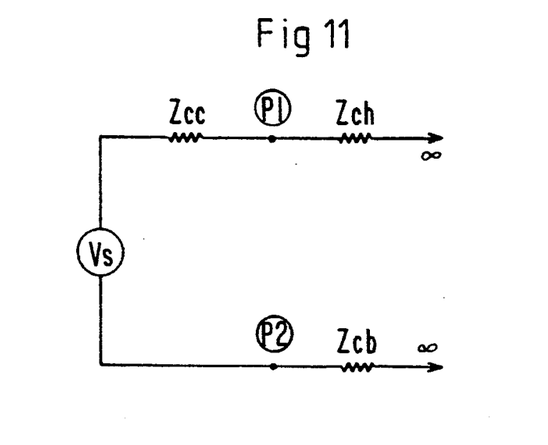
FIG. 11 is a schematic diagram illustrating impedances at the poles of the signal emanating from a transceiver.

FIGS. 9 to 11 are schematic diagrams for the apparatus according to the present invention. The diagrams illustrate the transmitter 14 emitting electronic signals, as well as the poles $P_1$ and $P_2$ of the dipole. Characteristic low and high impedances Zc are indicated on the electric diagram of FIG. 10, Rs designating the source impedance and Zcc the series impedance of the wave guide formed by the tube 17. The active part will be approximately several milliohms per 100 meters.

The equivalent, simplified diagram of FIG. 11 clarifies the coupling method employed in the invention, with the value VS being approximately equal to the expression:

$$\frac{Zcc \times Ve}{Rs}$$

The present invention has been described with respect to various embodiments thereof for purposes of illustrating the invention only. Various modifications will be apparent to those of skill in the art, and should be considered within the scope of the present invention. For example, in addition to the centering rings 31 for preventing the buckling of the drill string 17 too close to the transmitter 14, thus preventing a direct short circuit causing the poles $P_1$ and $P_2$ to move closer together, the drill string portions 17a and 17b could be coated in the area between the poles $P_1$ and $P_2$ with a continuous or discontinuous insulating layer. Such a layer could be formed, for example, from a non-conductive epoxy resin.

I claim:

1. A method of transmitting information between equipment at the bottom of an operation and the surface, comprising:

provida transmitter at the equipment at the bottom of the operation and a transceiver at the surface connected to both the ground, spaced from the operation, and to metal pipework of the operation; and applying electric signals with the transmitter between two points on the metal pipework, the two points being separated a substantial distance along the metal pipework such that the resistance of the metal of the metal pipework between the two points where the electric signal is applied is greater than zero resistance and a sufficient resistance to enable the electrical signals applied with the transmitter to be transmitted and thereby received by the transceiver at the surface.

2. The method of claim 1, wherein the two points on the metal pipework are directly conductively connected by the metal pipework.

3. The method of claim 1, wherein the transmitter has an upper conductor having a first polar end and a lower conductor having a second polar end, both the conductors being connected to the transmitter, and said step of applying the electric signal includes conductively connecting the first and second polar ends to the metal pipework for transmitting the electric signals with the transmitter, the polar ends of the conductors forming a dipole of substantial length along the metal pipework.

4. The method claim 3, wherein the metal pipework comprises a plurality of drill pipes, and the dipole has a length longer than one drill pipe.

5. The method of claim 3, wherein the metal pipework comprises a plurality of casing sections, and the dipole has a length extending over several of the casing sections.

6. The method of claim 3, wherein said step of applying further comprises separating the upper pole of the dipole a substantial distance from the ground and separating the lower pole of the dipole a substantial distance from a free lower end of the metal pipework.

7. The method of claim 3, wherein the dipole is longer than nine meters.

8. The method of claim 3, wherein the dipole is longer than twenty-seven meters.

9. The method of claim 3, wherein the metal pipework comprises a plurality of drill pipes in a drill shaft, and said step of applying further comprises spacing the first polar end from the surface of the earth or the bottom of the ocean by a distance at least equal to the length of several drill pipes and spacing the second polar end from the bottom of the drill shaft a distance at least equal to the length of several drill pipes.

10. The method of claim 3, wherein the metal pipework comprises a plurality of casing sections of a drill shaft, and said step of applying further comprises spacing the first polar end from the ground by a distance at least equal to the length of several casing sections and spacing the second polar end from the bottom of the drill shaft a distance at least equal to the length of several casing sections.

11. The method of claim 3, wherein the metal pipework is made up of a plurality of sections, and further comprising interposing an insulating connection between two successive metal pipework sections, connecting the first and second poles to the metal pipework on opposite sides of the insulating connection and locating the transmitter at the level of the insulating connection along the metal pipework.

12. The method of claim 3, and further comprising locating the transmitter outside of the area along the metal pipework between the first and second poles.

13. The method of claim 3, wherein the metal pipework comprises a casing having a pipe extending therein, and step of applying comprises locating the transmitter between the pipe and the casing.

14. The method of claim 3, wherein the metal pipework comprises a casing for a drill string, said step of providing includes positioning the transmitter against rock exterior of the casing, and said step of applying includes positioning the first and second polar ends on the casing.

15. The method of claim 3, wherein the metal pipework comprises a casing and the conductors comprise operation pipes in the casing, the operation pipes being insulated with a non-conductive resin over at least the portion thereof between the first and second polar ends.

16. The method of claim 15, and further comprising providing the operation pipes with centering rings for preventing buckling of the operation pipes between the first and second polar ends.

17. The method of claim 3, wherein the metal pipework comprises a casing and the conductors comprise operation pipes in the casing, said step of applying comprising providing insulating centering rings along the operation pipes over a substantial length and defining the first and second polar ends by points outside of the substantial length whereat the operation pipes contact the casing.

18. An apparatus for transmitting information between equipment at the bottom of an operation and the surface, comprising:

metal pipework for use in the operation;

a transceiver at the surface connected to both the ground, spaced from the operation, and said metal pipework; and transmitting means for applying electric signals between two points on said metal pipework, said two points being separated at a substantial distance along the metal pipework such that the resistance of the metal of the metal pipework between said two points is greater than zero and a sufficient resistance to enable the electrical signals applied with the transmitter to be transmitted and thereby received by the transceiver at the surface.

19. The apparatus of claim 18, wherein said two points in said metal pipework are directly conductively connected by said metal pipework.

20. The apparatus of claim 18, wherein said transmitting means comprises:

a transmitter;

an upper conductor having a first polar end and an opposite end connected to said transmitter; and a lower conductor having a second polar end and an opposite end connected to said transmitter; and wherein said first and second polar ends are conductively connected to said metal pipework to define said two points and define a dipole of substantial length.

21. The apparatus of claim 20, wherein said metal pipework comprises a plurality of sections and said dipole has a length extending longer than one said section.

22. The apparatus of claim 21, wherein said metal pipework comprises a plurality of casing sections and said dipole extends over several said casing sections.

23. The apparatus of claim 21, wherein said metal pipework comprises pipes having a length of nine meters.

24. The apparatus of claim 23, wherein said dipole extends over a length of more than three said pipes.

25. The apparatus of claim 21, wherein said first polar end of said dipole is spaced from the ground, a distance at least equal to several said sections, and said second polar end is spaced from the bottom of the drilling operation a distance at least equal to several said sections.

26. The apparatus of claim 20, wherein said metal pipework includes a casing and an operation pipe inside said casing, said transmitter and said conductors being located between said casing and said operation pipe.

27. The apparatus of claim 20, wherein said metal pipework has an electrical insulator between said polar ends of said conductors.

28. An apparatus for transmitting information between equipment at the bottom of an operation and the surface, comprising:
  metal pipework for use in the operation;
  a transceiver at the surface connected to both the ground spaced from the operation, and said metal pipework; and
  transmitting means for applying electric signals between two points on said metal pipework, said two points being separated at a substantial distance along the metal pipework such that the resistance of the metal pipework connecting said two points is greater than zero;
  wherein said transmitting means comprises:
    a transmitter;
    an upper conductor having a first polar end and an opposite end connected to said transmitter; and
    a lower conductor having a second polar end and an opposite end connected to said transmitter;
  wherein said first and second polar ends are conductively connected to said metal pipework to define said two points and define a dipole of substantial length; and
  wherein said transmitting means further includes a conductor cable forming said upper conductor and suspending said transmitter in said metal pipework.

29. The apparatus of claim 20, wherein said metal pipework comprises a casing having a drill string therein, said drill string forming said upper and lower conductors and said first and second polar ends.

30. The apparatus of claim 29, wherein said transmitter is located between said drill string and said casing, and said drill string has an electrical insulator therein separating said upper and lower conductors.

31. An apparatus for transmitting information between equipment at the bottom of an operation and the surface, comprising:
  metal pipework for use in the operation;
  a transceiver at the surface connected to both the ground spaced from the operation, and said metal pipework; and
  transmitting means for applying electric signals between two points on said metal pipework, said two points being separated at a substantial distance along the metal pipework such that the resistance of the metal pipework connecting said two points is greater than zero;
  wherein said transmitting means comprises:
    a transmitter;
    an upper conducter having a first polar end and an opposite end connected to said transmitter; and
    a lower conductor having a second polar end and an opposite end connected to said transmitter;
  wherein said first and second polar ends are conductively connected to said metal pipework to define said two points and define a dipole of substantial length; and
  wherein said metal pipework comprises production tubing, said upper conductor comprises a cable and a collar connected to said cable and said production tubing to form said first polar end, and said lower conductor comprises a collar connected to said transmitter and said production tubing.

32. The apparatus of claim 20, wherein said metal pipework is electrically insulated over its length between said polar ends.

33. A method of transmitting information between equipment at the bottom of an operation and the surface, comprising:
  providing a transmitter at the equipment at the bottom of the operation and a transceiver at the surface connected to both the ground, spaced from the drilling operation, and to metal pipework of the operation; and
  applying electric signals with the transmitter between two points on the metal pipework, the two points being separated a substantial distance along the metal pipework such that the resistance of the metal pipework connecting the two points where the electric signal is applied is greater than zero resistance, and wherein no insulating junction is interposed between the two points in the metal pipework connecting the two points.

34. An apparatus for transmitting information between equipment at the bottom of an operation and the surface, comprising:
  metal pipework for use in the operation;
  a transceiver at the surface connected to both the ground spaced from the operation, and said metal pipework; and
  transmitting means for applying electric signals between two points on said metal pipework, said two points being separated at a substantial distance along the metal pipework such that the resistance of the metal pipework connecting said two points is greater than zero, wherein no insulating junction is interposed between said two points in said metal pipework connecting said two points.

35. The apparatus of claim 28, wherein said conductor cable comprises an insulated core and a metal jacket short-circuited with said polar ends, said metal jacket extending over said transmitter.

36. An apparatus for transmitting information between equipment at the bottom of an operation and the surface, comprising:
  metal pipework for use in the operation;
  a transceiver at the surface connected to both the ground, spaced from the operation, and said metal pipework; and
  transmitting means for applying electric signals between two points on said metal pipework, said two points being separated at a substantial distance along the metal pipework such that the resistance of the metal pipework connecting said two points is greater than zero;

wherein said transmitting means comprises:
  a transmitter;
  an upper conductor having a first polar end and an opposite end connected to said transmitter; and
  a lower conductor having a second polar end and an opposite end conducted to said transmitter;
wherein said first and second polar ends are conductively connected to said metal pipework to define said two points and define a dipole of substantial length;
wherein said metal pipework comprises a casing having a drill string therein, said drill string forming said upper and lower conductors and said first and second polar ends; and
wherein said polar ends are defined by points of contact between said drill string and said casing, said drill string having a plurality of casing protectors thereon between said polar ends.

37. The apparatus of claim 31, wherein said cable is an insulated conductor disposed inside a metal clad tube, and said transmitter is disposed inside a continuous metal jacket.

38. An apparatus for transmitting information between equipment at the bottom of an operation and the surface, comprising:
  metal pipework for use in the operation;
  a transceiver at the surface connected to both the ground, spaced from the operation, and said metal pipework; and
  transmitting means for applying electric signals between two points on said metal pipework, said two points being separated at a substantial distance along the metal pipework such that the resistance of the metal pipework connecting said two points is greater than zero;
wherein said transmitting means comprises:
  a transmitter;
  an upper conductor having a first polar end and an opposite end connected to said transmitter; and
  a lower conductor having a second polar end and an opposite end conducted to said transmitter;
wherein said first and second polar ends are conductively connected to said metal pipework to define said two points and define a dipole of substantial length;
wherein said metal pipework comprises a casing having production tubing therein, said production tubing forming said upper and lower conductors and said first and second polar ends; and
wherein said polar ends are defined by points of contact between said production tubing and said casing, said production tubing having a plurality of casing protectors thereon between said polar ends.

* * * * *